United States Patent [19]
Sato et al.

[11] Patent Number: 6,064,832
[45] Date of Patent: May 16, 2000

[54] CAMERA WITH PRINT INFORMATION RECORDING FEATURE

[75] Inventors: Muneyoshi Sato, Kurihashi-machi; Hideo Kobayashi, Omiya; Minoru Ishiguro, Urawa; Hideo Yoshida, Omiya, all of Japan

[73] Assignee: Fuji Photo Optical Co., Ltd., Saitama, Japan

[21] Appl. No.: 08/266,865

[22] Filed: Jul. 5, 1994

Related U.S. Application Data

[63] Continuation of application No. 07/958,189, Oct. 9, 1992, abandoned.

[30] Foreign Application Priority Data

Oct. 11, 1991 [JP] Japan .................................. 3-292379

[51] Int. Cl.[7] .................................................. G03B 17/24
[52] U.S. Cl. ........................ 396/311; 396/315; 396/436
[58] Field of Search .................................. 354/106, 159, 354/289.1; 396/311, 315, 435, 436

[56] References Cited

U.S. PATENT DOCUMENTS

| | | | |
|---|---|---|---|
| 4,330,186 | 5/1982 | Hattori | 354/106 |
| 4,705,372 | 11/1987 | Lapeyre | 354/106 |
| 4,862,201 | 8/1989 | Taniguchi et al. | 354/106 |
| 5,003,329 | 3/1991 | Itabashi | 354/106 |
| 5,057,857 | 10/1991 | Hata et al. | 354/106 |
| 5,060,006 | 10/1991 | Taniguchi et al. | 354/106 |

FOREIGN PATENT DOCUMENTS 2-310553  12/1990  Japan .

*Primary Examiner*—David M. Gray
*Attorney, Agent, or Firm*—Evenson, McKeown, Edwards & Lenahan, P.L.L.C.

[57] ABSTRACT

A compact camera has a built-in light-emitting display device which displays, as print information, a specific code. The specific code includes alphabetical characters when a print information set switch is operated. The device is alternatively allowed to display a six digit number. The alphabetical characters or number represents date information pertaining to exposure of a film frame, including a year, a month and a date. The print information appears as a visible image on developed film and is optically read by a photographic printer so as to automatically set the photographic printer to a printing condition determined by the print information.

3 Claims, 4 Drawing Sheets

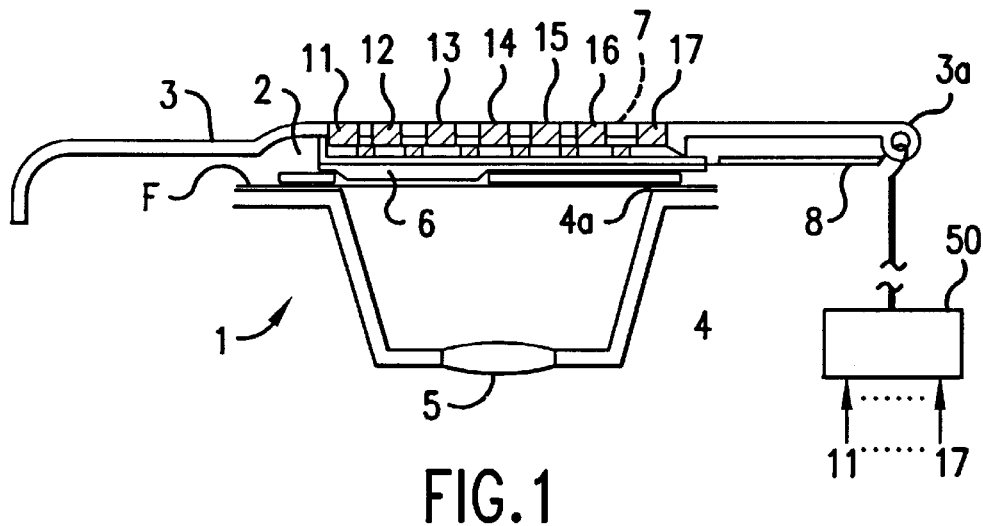
FIG.1
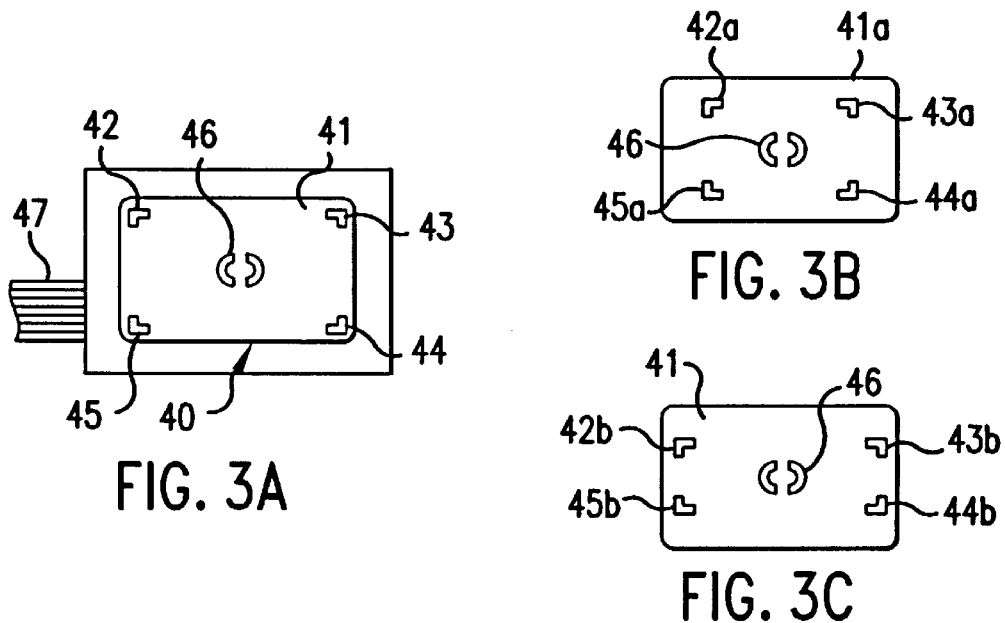
FIG. 3A
FIG. 3B
FIG. 3C
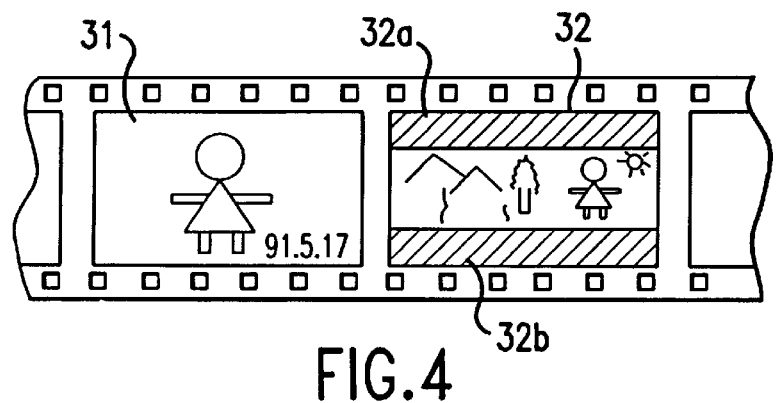
FIG.4

CAMERA WITH PRINT INFORMATION RECORDING FEATURE

This is a continuation of application Ser. No. 07/958,189, filed Oct. 9, 1992, abandoned.

BACKGROUND OF THE INVENTION

1. Field of the Invention

The present invention relates to a camera and, more particularly, to a camera equipped with a print data recording means for recording, on a film during exposure of the film, print information or data concerning trimming, enlarging, etc., which are used to make desired prints from the film.

2. Description of Related Art

Multi-function photographic cameras, including those which are called "compact cameras," have been developed to meet a variety of needs. Such compact cameras are equipped with various functions, such as a multi-focal length function, a zoom function, a panoramic photograph function, and so on. A multi-focal length compact camera having two different photographic modes, each of which may be selected without using interchangeable lenses, for example, is available. Such photographic modes may include a tele-photographic mode and a standard photographic mode. A compact camera having a zoom function and continuously varied focal lengths is available. Also, a compact camera, having a panorama photographic function, may be provided with an exposure aperture frame which is changeable between standard and panorama sizes. When the exposure aperture frame is in a panorama size mode, it opaquely conceals upper and lower sides of the standard size exposure aperture frame which meets a full size film frame so as to define an exposure aperture which is elongated in a lengthwise direction of the film.

If sufficient proximity to a subject is not allowed, it is impossible to take a picture of the subject which is as large as a full size film frame, even when a multi-function compact camera is used. Moreover, even though a multi-function compact camera may be as close to a subject as is intended, the shortest focal length of such a multi-function compact camera is sometimes still too long to take a picture of the subject which is as large as the full size film frame. On some occasions, upper and lower portions of panoramic scenes are to be excluded from composed, i.e., composite, pictures. In these situations, it is a common practice to take a picture at an allowed distance, to take a picture with the shortest focal length, and to take a picture with the longest focal length, respectively. These pictures are then manually trimmed, with reference to previously and ordinarily printed corresponding pictures, so as to provide desirably composed prints.

Although compact cameras are typically compact and light, it is necessary to provide a number of mechanical and optical parts to equip a compact camera with such various functions. This tends to make the compact camera heavy and bulky. Additionally, even though a multi-function camera may be available, in order to obtain satisfactorily trimmed or composed prints by various functions, intended prints unavoidably must be made at least two times.

SUMMARY OF THE INVENTION

It is a primary object of the present invention to provide a compact camera which is equipped with an information recording feature.

It is another object of the present invention to provide a compact camera with an information recording feature which is able to record selectively an exposure date, which appears on a printed picture, and trimming information, which is optically read by a photographic printer, so as to adjust the photographic printer according to the trimming information during processing of a film for making a satisfactorily trimmed print.

These objects of the present invention are achieved by providing a compact camera equipped with a light-emitting display means for displaying exposure date information. The display means consists of, for instance, a six digit number, which indicates a year, a month and a date, and exposing the exposure date information to a frame of a film in the camera when the frame is exposed to photograph a subject. A print information set means is provided so as to be operable outside the compact camera. The light-emitting display means is caused to display print information as a specific code, including alphabetical characters, only when the print information set means is operated. Otherwise, the exposure date information can be displayed. The print information is exposed on and within a full size film frame area and appears as a visible image on the film frame when the film is developed. The visible print information is optically read by a photographic printer so as to automatically set the photographic printer to a printing condition indicated by the print information.

Specifically, the light-emitting display means comprises a plurality of, for instance six, light-emitting elements, each of which consists of seven segments. The seven segments are arranged so as to be able to display arabic numerals from "1" to "9" and a zero (0). First, second and third digit pairs of a six digit number displayed by the light-emitting display means, indicate a year, a month, and a day, respectively.

Print information set by the print information set means may be a zoom ratio, to which a photographic printer automatically changes a focal length of a zoom lens so as to make an enlarged print from a frame when optically reading the print information, and a ratio of length and breadth of a frame, at which the photographic printer automatically makes a panoramic print from the frame when optically reading the print information.

BRIEF DESCRIPTION OF THE DRAWINGS

The above and other objects and features of the present invention will be clearly understood from the following description of a preferred embodiment thereof when considered in conjunction with the drawings, in which:

FIG. 1 is a schematic illustration showing a part of a compact camera equipped with a date recording feature in accordance with a preferred embodiment of the present invention;

FIGS. 3A to 3C are illustrations of a view finder of the compact camera; and

FIG. 4 is an illustration of a part of a film which has been exposed by the compact camera and processed.

DESCRIPTION OF THE PREFERRED EMBODIMENT

Figure 2A:
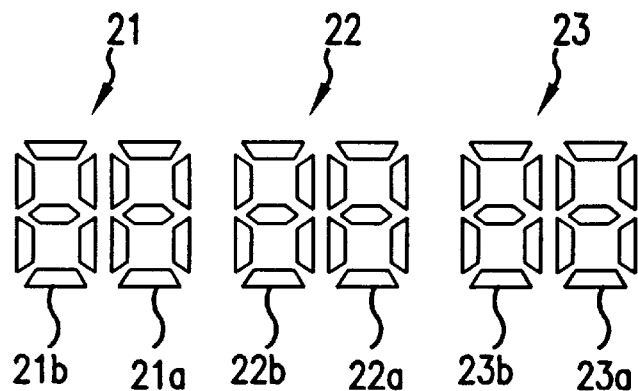
FIGS. 2A to 2H are illustrations of light-emitting elements of a date display module of the compact camera.

Because camera mechanisms are, in general, well known, the present description is particularly directed to elements forming part of, or cooperating directly with, a device in accordance with the present invention. It is to be understood that elements not specifically shown or described can take various forms well known to those skilled in the camera art.

FIG. 1 of the drawings shows a part of a compact camera in accordance with a preferred embodiment of the present invention having an information recording device for recording or exposing photograph information, such as date and time. A camera body 1 has a lens barrel 4 and a back lid 3. The lens barrel 4 supports a taking lens, or a taking lens system, which focuses an image of a subject on a film F placed behind an exposure aperture frame 4a. The back lid 3 is hinged to the camera body 1 by a hinge 3a so as to open and close a film chamber 2. The camera 1 has a flash photographing function for automatically performing a flash exposure when ambient light is lower, in intensity, than a predetermined light intensity. Further, the camera has a motor-driven film rewinding function for automatically rewinding a film immediately after all frames of the film have been exposed.

The back lid 3 is provided with what is referred to as "date recording means" attached to an inner face thereof. The date recording means displays and exposes a date or a time on the film F during, or otherwise immediately after, an exposure of a frame of the film F. Specifically, the date recording means includes an exposure module 6 and a date display module 7, both of which are electrically coupled to a built-in control circuit 50 by means of wiring 8. When an exposure is made, images of numbers, which indicate date or time, are exposed on the film P. The term "date" as used above refers to year, month and day.

Further, the back lid 3 is provided with various function set switches, such as camera function and printer function set switches. The camera function set switches include a date set switch 11, a date mode set switch 12, a flash photograph mode set switch 13, an infinite mode set switch 14, and a film rewind switch 15. The print function set switches include a print enlargement mode switch 16 and a panorama print mode switch 17. These switches 11–17 are electrically coupled to the control circuit 50 by the wiring 8 as well. When any one of these switches 11–17 is operated by a user, the control unit 50 provides a signal representative of a function selected by the switch.

When the date set switch 11 is operated, the control unit 50 allows the date display module 7 to display the complete date on which the exposure was made. However, when the date mode set switch 12 is operated before an exposure, the control circuit 50 causes the date display module 7 to display a date or a time only. When any one of the camera function set switches 13–15, other than the date set switch 11 and the date mode set switch 12, is operated, the control circuit 50 forces the camera to perform a specific operation. That is, when the flash photograph mode set switch 13 is operated, the camera 1 is forced to shift to a flash photography mode regardless of ambient light intensity. Such a flash photography mode is selected whenever back-light photography is intended. The infinite mode set switch 14 is operated when it is intended to focus the taking lens 5 to infinity. If a demand to rewind the film F occurs even if some unexposed frames remain, the film rewind switch 15 is operated. Once the film rewind switch 15 is operated, the control circuit 50 causes the camera 1 to automatically rewind the film F quickly.

The printer function set switches 16 and 17 are used to record printing information on every frame, or only desired frames, of the film F. The printing information is optically read by a printer while making prints from frames of a processed film F. When the print enlargement mode switch 16 is operated, the control circuit 50 causes the date display module 7 to display a specific sign or code, which indicates a specific zoom ratio of a zoom lens of a photographic printer. An image of such a specific code, displayed by the date display module 7, is recorded on a frame of the film F. When a photographic printer optically reads the specific code on the frame, it automatically changes the focal length of its zoom lens to the zoom ratio indicated by the specific code so as to make an enlarged print of a center portion of a picture of the frame. It is to be understood that the print enlargement mode switch 16 may have a plurality of selections for a plurality of zoom ratios of the zoom lens available in the photographic printer. The panorama print mode switch 17 is operated when a panorama print is desired. Panorama printing is performed by trimming a frame so as to make an oblong print of a desired size from the frame. When the panorama print mode switch 17 is operated, the control circuit 50 causes the date display module 7 to display a specific code. The specific code indicates specific print sizes and is recorded on a frame of the film F. When a photographic printer optically reads the specific code on the frame, it automatically changes the print size indicated by the specific code so as to make a panoramic print from the frame. It is also to be understood that the panorama print mode switch 17 may have a plurality of selections for a plurality of ratios of length and breadth. Codes including numerals and alphabetical letters, indicative of date, time, and other specific information, are recorded on each frame at, for instance, its lower corner.

Figure 2B:
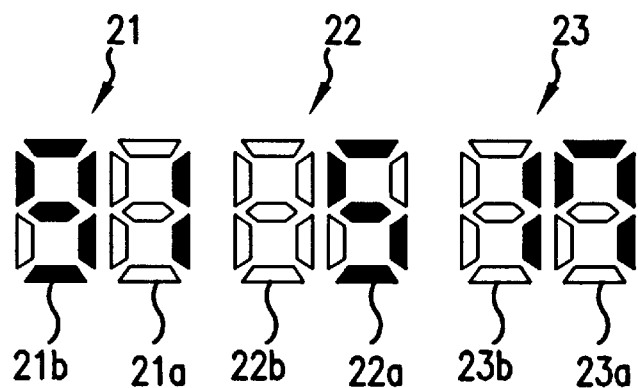

FIGS. 2A to 2H show the date display module 7 as including six numerals 21a, 21b, 22a, 22b, 23a and 23b arranged in a straight line. Each numeral consists of seven segments of light emitting diodes (LEDs), which are divided into first to third groups 21, 22 and 23, as shown in FIG. 2A. The first two numerals 21a and 21b indicate a year as a two digit number, the second two numerals 22a and 22b indicate a month as a two digit number, and the last two numerals 22a and 22b indicate a day as a two digit number. The light emitting diode (LED) segments are selectively excited to display a date. For example, as shown in FIG. 2B, when the date set switch 12 is operated, the date display module 7 excites the first to sixth digits, except the third digit, so as to display numbers "9," "1," "5," "1" and "7," respectively, which indicate a date of May 17, 1991. Such a date is automatically renewed so that it is up to date. The date of "91. 5. 17" is recorded on a frame 31 of the film F, along with a picture of a subject, as shown in FIG. 4. A print made from the frame 31 includes the image of the date as well as the picture of the subject. It is, however, to be understood that each seven digit numeral of the date display module 7 may be formed from liquid crystal elements, or liquid crystal elements and electric lamps, instead of the light emitting diodes (LEDs).

Figure 2C:
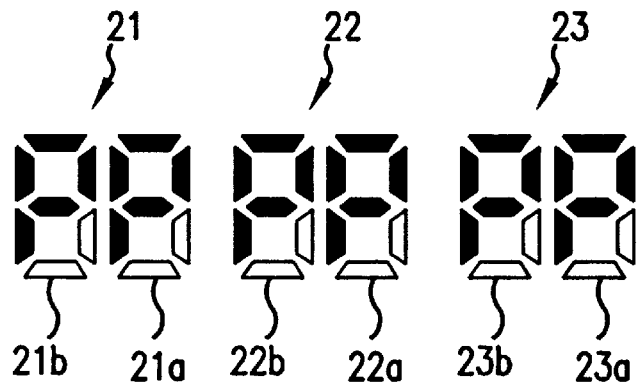

When the panorama print mode switch 17 is operated, the control unit 50 causes the date display module 7 to excite all the digits 21a to 23b so as to display a specific code consisting of the same alphabetical letters, such as "P P P P P P," in place of numbers, as shown in FIG. 2C. This indicates that the frame with the code is exposed with an intention of producing a panoramic picture. The panorama print code "P P P P P P" is recorded on a frame 32 of the film F at its lower corner along with a picture of a subject as shown in FIG. 4. During printing, when a photographic printer optically reads the panorama print code "P P P P P P" of the frame 32 of the film F, it mechanically or optically conceals upper and lower sides 32a and 32b of the frame 32 (shaded in FIG. 4) so as to make an oblong or panoramic print. Because the panorama print code "P P P P P P" of the frame 32 of the film F is concealed during printing, it does not appear on the panoramic print. The width of a concealed side depends on ratios of length and breadth of desired panoramic prints selected by the panorama print mode switch 17. For example, a panoramic print length to breadth ratio of "2" may be selected. The date display module 7, in this case, will display a code consisting of five of the same alphabetical letters and a number, such as "P P P P P 2."

Figure 2D:
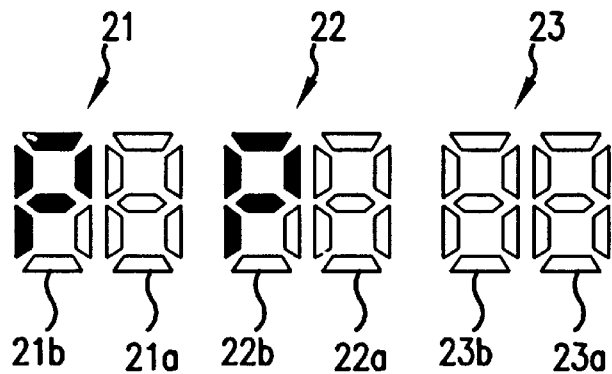
Figure 2E:
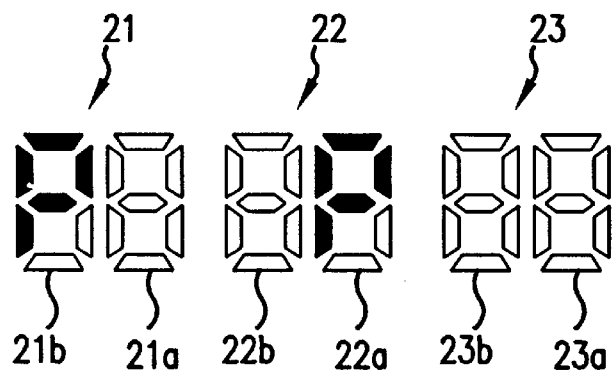
Figure 2F:
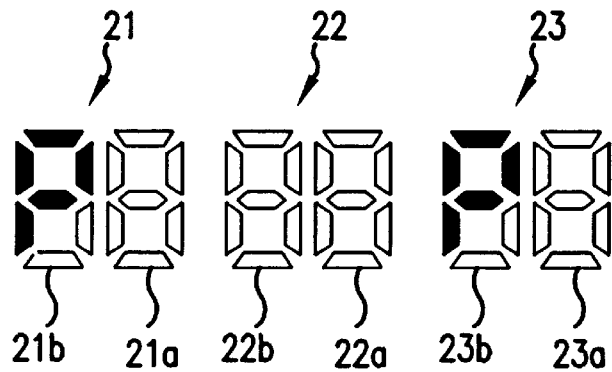
Figure 2G:
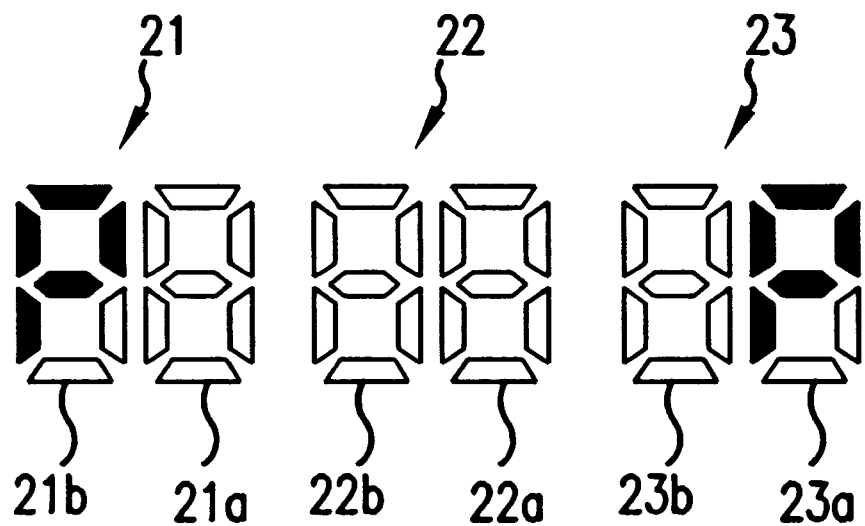
Figure 2H:
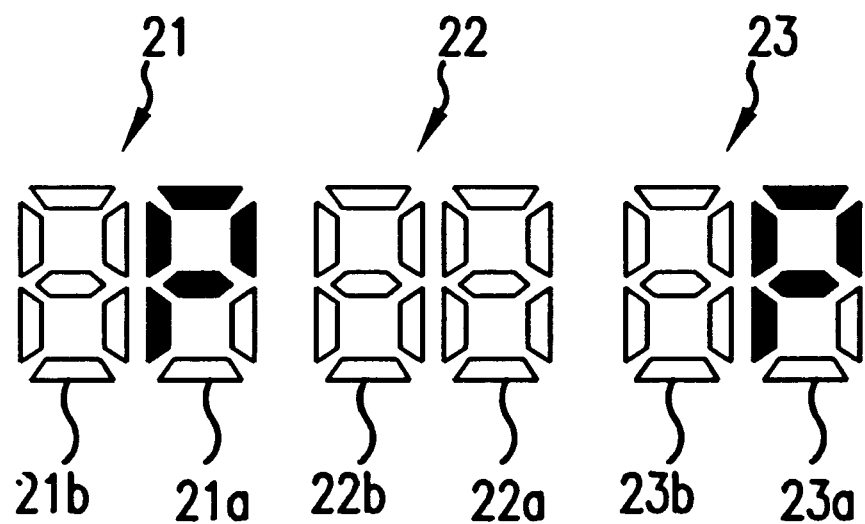

When the print enlargement mode switch 16 is operated, the control unit 50 causes the date display module 7 to excite two out of six digits 21a to 23b so as to display a specific code consisting of two same alphabetical letters, such as "P - P - - -" in place of numbers, as shown in FIG. 2D. Throughout this specification, the symbol "-" is used to represent a blank. This code indicates that the frame with the code is exposed and an enlargement of a center portion of the frame is intended. This print enlargement code "P - P - - -" is recorded on the frame of the film F at its lower corner along with a picture of a subject. During printing, when a photographic printer optically reads the print enlargement code of "P - - - - -", it automatically changes the focal length of the zoom lens to a zoom ratio specified by the print enlargement code. Such a zoom ratio may, for example, be 1.25. An enlarged picture of a center portion is made from the frame with the print enlargement code. By using a zoom lens having an angle of view covering only a frame area except that portion in which the print enlargement code is exposed, the print enlargement code does not appear on an enlarged print.

The print enlargement mode switch 16 may have a plurality of selections for a plurality of zoom ratios. Codes, consisting of two of the same alphabetical letters, such as "P," at different positions, indicative of zoom ratios, are recorded on each frame at, for instance, its lower corner. For example, as shown in FIGS. 2E to 2H, codes of "P - - P - -", "P - - - P -", "P - - - - P" and "- P - - - P" indicate zoom ratios of 1.5, 1.75, 2.0 and 3.0, respectively.

FIG. 3A to 3C show a view finder 40, incorporated in the camera, with print information recording feature. The view finder 40 incorporated in the camera with a print information recording feature is shown. The view finder 40 includes a view screen 41 on which an optical image of a subject is projected through a finder optical system (not shown). In the finder optical system, a liquid crystal display (which is not shown and is hereafter referred to as a LCD) is electrically coupled to the control circuit 50 through wiring 47. When the crystal liquid display plate is excited, it selectively displays sets of framing marks 42–45, 42a–45a and 42b–45b according to operations of the print function set switches 16 and 17. The respective set of framing marks 42–45, 42a–45a and 42b –45b are projected as an optical image on the finder screen 41 by the finder optical system and defines an effective framing area. On the finder screen 41, mark 46 is projected at a center of the screen as a target mark for automatic focusing.

While neither the print enlargement mode switch 16 nor the panorama print mode switch 17 is operated, the control circuit 50 excites the LCD so as to project an optical image of the framing marks 42–45 on the finder screen 41, as shown in FIG. 3A. The framing marks 42–45 are designed and adapted so that a framing area, defined by the framing marks 42–45, meets a full size of a frame 31 of the film F. The film F may, for instance, be a 35 mm film. However, if the print enlargement mode switch 16 is operated, the control circuit 50 excites the LCD so as to display an optical image of the framing marks 42a–45a as shown in FIG. 3B and define an effective framing area. Such an effective framing area is smaller than the effective framing area defined by framing marks 42–45, covered by the zoom lens of the photographic printer. The framing marks 42a–45a are designed and adapted to exclude a lower portion of an exposure aperture defined by the exposure aperture frame 4a, in which an image of specific code or a date is projected by the exposure module 6 of the date recording means. If, however, the panorama print mode switch 7 is operated, the control circuit 50 excites the LCD so as to display an optical image of the framing marks 42b–45b, as shown in FIG. 3C and define an oblong effective framing area configuration. The framing marks 42b–45b are also designed and adapted to exclude the lower portion of the exposure aperture defined by the exposure aperture frame 4a, in which an image of a specific code or a date is projected by the exposure module 6 of the date recording means. The focusing target mark 46 is displayed at a center of any effective framing area. Also, the film P is exposed to neither the framing marks 42–45, 42a–45a or 42b–45b nor the focusing mark 46.

In order to make prints from an exposed and processed film P which includes a mix of frames with dates and specific codes, automatic photographic printers equipped with optical readers or scanners, which can read and recognize numerals and alphabetical letters recorded on a lower corner of each frame of the film, may be used. The printing preferably includes a zoom lens and is capable of trimming. Various photographic printers of this kind are widely available in the photographic field.

The automatic photographic printer makes one print after another from frames of the film F. When the photographic printer optically reads a print enlargement code developed on a frame, such as the code "P - - P - -" shown in FIG. 2E, it causes the zoom lens to automatically change its zoom ratio to 1.25. On the other hand, if the photographic printer optically reads a panorama print code developed on a frame 32, such as the code "P P P P P P" shown in FIG. 2C, it mechanically or optically conceals upper and lower sides 32a and 32b of the frame 32 (shaded in FIG. 4) so as to expose only an oblong area of the frame 32.

It is to be understood that although a preferred embodiment of the present invention has been described, various other embodiments and variants may occur to those skilled in the art. Any such other embodiments and variants which fall within the scope and spirit of the invention are intended to be covered by the following claims.

We claim:

1. A camera, equipped with an exposure date recording feature for recording print size information on a film to be optically read by a photographic printer having a zoom lens so as to automatically change a focal length of the zoom lens based on the print size information and permit different sizes of pictures to be made from a regular size frame and simultaneously conceal portions of the regular size frame based on said print size information if said print size information contains panoramic size information so as to make a panoramic size print from said regular size frame, said camera comprising:

a camera body provided with subject exposure means for optically exposing a subject to a frame of film disposed in said camera body;

a light-emitting display module, including a first pair of light-emitting elements, a second pair of light-emitting elements and a third pair of light-emitting elements built in said camera body, for displaying at least one of date information, representing a date of exposure of the frame of said film, and time information, representing a time of exposure of the frame of said film, and exposing the information displayed thereon to a frame of said film when exposing the subject to said frame of said film through said subject exposure means; and print information set means, provided on said camera body and operable from outside of said camera body, for (a) causing said light-emitting display module to display, as panoramic print information, a specific code including alphabetical characters when said print information set means is operated so that at least one of said first pair of light-emitting elements displays at least one of said alphabetical characters, (b) allowing said light-emitting display module to display numerals as the information displayed thereon, and (c) exposing said print information on at least one of the portions of said frame so that said print information appears as a visible image on said frame when said film is developed and is optically read by the photographic printer.

2. A camera as defined in claim 1, wherein each of said light-emitting elements includes seven segments arranged so as to display arabic numerals from "1" to "9" and a zero.

3. A camera as defined in claim 2, wherein six of said light-emitting elements capable of displaying a six digit number as data information are provided, said first pair of said six light-emitting elements indicating a year, said second pair of said six light-emitting elements indicating a month, and said third pair of said six light-emitting elements indicating a day.

* * * * *